(12) United States Patent
Peter et al.

(10) Patent No.: US 7,605,716 B2
(45) Date of Patent: Oct. 20, 2009

(54) TELEMETRY SYSTEM WITH AN INSULATING CONNECTOR

(75) Inventors: Andreas Peter, Celle (DE); Volker Krueger, Celle (DE); Johan Witte, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 802 days.

(21) Appl. No.: 11/344,290

(22) Filed: Jan. 31, 2006

(65) Prior Publication Data

US 2006/0202852 A1    Sep. 14, 2006

Related U.S. Application Data

(60) Provisional application No. 60/648,597, filed on Jan. 31, 2005.

(51) Int. Cl.
  *G01V 3/00* (2006.01)
(52) U.S. Cl. .................. 340/854.6; 340/854.4; 166/378; 367/81; 343/793
(58) Field of Classification Search .............. 340/854.4, 340/854.6, 854.7; 343/793, 799; 367/81; 166/378
See application file for complete search history.

(56) References Cited

U.S. PATENT DOCUMENTS

4,584,675 A    4/1986    Peppers
5,138,313 A    8/1992    Barrington
5,394,141 A    2/1995    Soulier
5,942,990 A    8/1999    Smith et al.
5,945,923 A    8/1999    Soulier
6,404,350 B1   6/2002    Soulier
6,628,206 B1   9/2003    Soulier
6,796,376 B2   9/2004    Frazier
2004/0104047 A1  6/2004  Peter
2004/0169367 A1  9/2004  Sutherland et al.
2004/0206510 A1  10/2004 Fraser et al.

*Primary Examiner*—Albert K Wong
(74) *Attorney, Agent, or Firm*—Madan & Sriram, P.C.

(57) ABSTRACT

The present invention provides an electromagnetic telemetry apparatus and methods that include an insulating connector that comprises an outer metallic female member that has an inner conical longitudinal surface. In one embodiment, a tubular metallic male member is disposed in the female member, thereby crating an axial conical gap between the male and female members. A conical metallic sleeve having dimensions that substantially correspond to the axial conical gap is disposed in the axial conical gap. The outer tubular surface of the male member is coated with an insulating material, such as a ceramic material. A shoulder at one end of the male member prevents axial movement of the sleeve in one direction and a parallel key between the female member and a stabilizer member prevents rotational movement between the male and female members. The sleeve remains stationary relative to the insulated surface of the male member when the male and female members move longitudinally relative to each other. In an alternative embodiment, a double pin is connected between a lower section and an upper section. Insulation is provided at one end of the double pin. A loading sleeve disposed around the pin absorbs compressional stress and also electrically isolates the upper and lower sections.

21 Claims, 10 Drawing Sheets

TELEMETRY SYSTEM WITH AN INSULATING CONNECTOR

BACKGROUND OF THE INVENTION

This application takes priority from U.S. Provisional Patent Application Ser. No. 60/648,597, filed on Jan. 31, 2005.

1. Field of the Invention

The present invention relates generally to apparatus and methods for transmitting electromagnetic signals from a wellbore location to the earth's surface. In particular aspects, the invention relates to electromagnetic telemetry tools wherein an insulating connector or joint is used in the drill-string to form a dipole antenna for the telemetry tool.

2. Description of the Related Art

During drilling of wellbores in earth formations for the production of oil and gas (hydrocarbons) or other wellbore operations, such as completion etc., data or signals from a variety of downhole sensors carried by the drillstring or other metallic tubulars is processed downhole and transmitted to the surface for further processing and use. A variety of data transmission apparatus and methods are used to transmit or telemeter data to the surface. Electromagnetic ("EM") telemetry systems are often used for transmitting relatively large amounts of data during drilling and other wellbore operations.

The data transmitted can include data from sensors such as pressure sensors, temperature sensors, sensors that provide data relating to the borehole conditions and drill string condition, and from a variety of other sensors that provide information about the earth formations. Such sensors herein are referred generally as the measurement-while-drilling or "MWD" sensors. The formation evaluation sensors may include resistivity, acoustic, nuclear, and magnetic resonance sensors. Data from sensors relating to drilling direction and borehole condition, also, is transmitted.

In an EM telemetry system carried by a drillstring, encoded signals are generated by an EM transmitter (source) disposed in a drilling assembly. The transmitted signals travel to the surface via the earth formation. These signals are received by a receiver at the surface and deciphered by a control circuit or processor.

For drilling operations, the EM telemetry apparatus is typically carried by or made a part of the drilling assembly (also referred to as the bottomhole assembly or "BHA"). The BHA is conveyed into the wellbore by a metallic tubular, such as a drill pipe that is made up of jointed pipe sections or a coiled tubing. The metallic tubular is used as the dipole antenna for the EM telemetry tool. This is done by dividing or separating the drill string into two conductive portions or sections by an insulating joint or connector (also referred herein as the "gap sub"). The insulating joint or connector is typically placed near the top of the BHA, the BHA and the drill pipe each forming an antenna for the dipole antenna of the EM tool. The signals or data to be transmitted to the surface are provided to the EM telemetry tool by controllers and processors carried by the BHA.

The use of gap subs, or insulated connectors for electrical isolation is known. U.S. Pat. No. 5,138,313 issued to Barrington, for example, discloses an electrically insulative gap sub assembly wherein the outer surface of a drill pipe joint is covered by several molded "gap blocks" of the insulative material. This technique can be expensive and complex in construction. In addition, it can also be prone to damage within the wellbore.

U.S. Pat. No. 4,348,672 issued to Givler describes an insulated drill collar gap sub assembly that is used with a particular toroidal-coupled telemetry system. An insulated gap is formed between a pair of annular sub members by forming a gap between them and filling the gap with a dielectric material. To interconnect the gap sub within the drill string, adjoining sub members are essentially keyed to one another using hexagonal keying. In an alternative version of the device, subs are connected using an axially extending member that resides within an axially extending recess. Pins are used to lock the two subs together, and a dielectric material is disposed in a gap between them. In each case, axial bearing assemblies are necessary to help transmit force through the gap sub. A significant disadvantage to this type of arrangement is the requirement for special tooling to form the various keys or extensions and recesses to mechanically lock the components together.

Additionally, U.S. Pat. No. 5,163,714 to describes an insulated connector that has limited mechanical strength. Another type of insulating connector is described in U.S. Pat. No. 6,404,350 to (the "'350 patent"), wherein an insulating coating or layer is applied to one of the two conical mating surfaces of the connector separating the upper and lower portions. In the system of the '350 patent, the insulating coating is stressed when the mating parts are joined, due to contact pressure and further due to relative movement of the two mating parts. Such insulating joints can be a source of failure downhole.

The present invention provides an EM telemetry system that has an insulating connector or gap sub that addresses some of the problems associated with the prior art gap subs.

SUMMARY OF THE INVENTION

The present invention provides an electromagnetic telemetry apparatus wherein an insulating connector electrically insulates an upper and a lower section of a drill string or another work string for use in a wellbore. In one embodiment of the present invention, the insulating connector comprises an outer metallic female member that has an inner conical longitudinal surface. A tubular metallic male member is disposed in the female member, thereby creating an axial conical gap between the male and female members. A conical metallic sleeve having dimensions that substantially correspond to the axial conical gap is disposed in the axial conical gap. The outer tubular surface of the male member is coated or sprayed with an insulating material, such as ceramic material. Also, any other surface that is in contact with the female member that can establish an electrical connection between the upper and a lower sections of the drill string is coated with the insulating material. A shoulder on one end of the male member prevents axial movement of the sleeve in one direction. Parallel keys or another suitable coupling between the male member and a member such as a stabilizer downhole of the female member prevents rotational movements between the male member and the stabilizer. The sleeve remains stationary relative to the insulated surfaces of the male member when the male and female members move longitudinally or axially relative to each other.

In another aspect, the present invention provides an insulting connector that has a double-ended pin connected to an upper and lower subs or sections. A sleeve around the pin is utilized to absorb compression loads. An upper end of the pin and/or a mating end of the upper section contain an insulating material. One end of the sleeve and/or a shoulder that abuts the sleeve also is coated with an insulating material. In another aspect, the sleeve comprises multiple sleeves or may include a stack of rings.

A suitable connector, such as a bow spring connector, provides an electrical contact or electrode for the upper section of the drill string and a suitable connector downhole of the insulating connector provides the electrical contact or an electrode for the lower portion of the drill string. During operation of the EM telemetry tool, the encoded signals are received at the surface by a suitable receiver and transmitted to a surface controller for further processing according to programmed instructions associated with the surface controller.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawing, wherein.

DETAILED DESCRIPTION OF THE INVENTION

Figure 1:
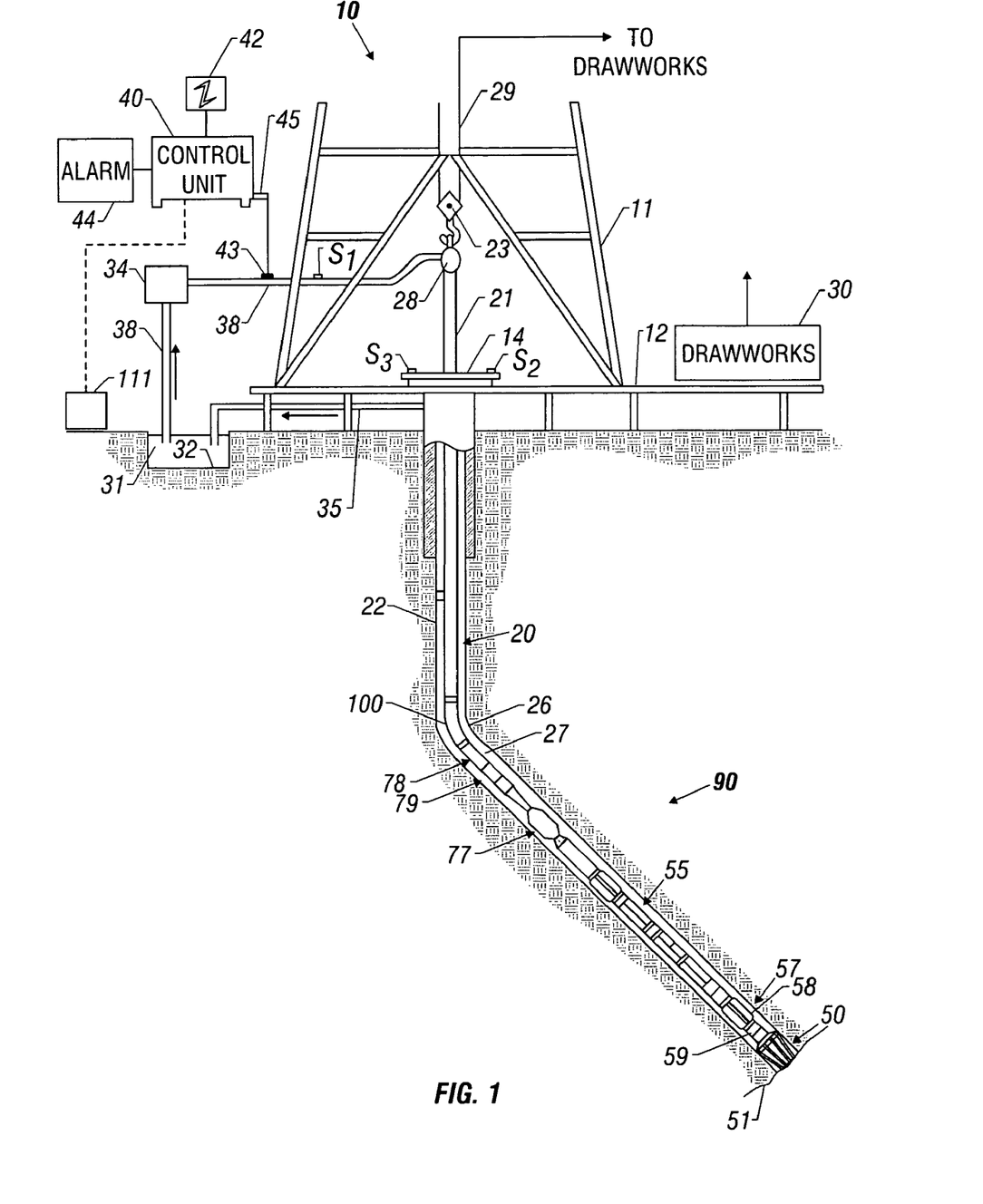
FIG. 1 (Prior Art) shows a schematic illustration of a drilling system in which an EM telemetry tool is disposed in a drilling assembly that is carried by a drill pipe.

FIG. 1 shows a schematic diagram of a drilling system 10 in which a drillstring 20 carrying a drilling assembly 90 or BHA is conveyed in a "wellbore" or "borehole" 26 for drilling the wellbore. The drilling system 10 may include a conventional derrick 11 erected on a platform or floor 12 which supports a rotary table 14 that is rotated by a prime mover such as an electric motor (not shown) at a desired rotational speed. The drillstring 20 includes a metallic tubing 22 (a drill pipe or tubing generally made by joining metallic pipe sections) that extends downward from the surface into the borehole 26. The drill string 20 is pushed into the wellbore 26 when a drill pipe 22 is used as the tubing. A drill bit 50 attached to the end of the drillstring 20 breaks up the geological formations when it is rotated to drill the borehole 26. The drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

The drill bit 50 may be rotated by only rotating the drill pipe 22, or a downhole motor 55 (mud motor) disposed in the drilling assembly 90 or by both the drill pipe 22 and the mud motor 55. In the exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module 59 contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. An EM telemetry tool or communication system 100 is provided near an upper end of the drilling assembly 90. The data or signals from the various sensors by the drilling assembly 90 are processed and the signals to be transmitted to the surface are provided to the EM telemetry system 100 for transmission of such data or signals to the surface.

The communication tool 100, a power unit 78 and measurement while drilling ("MWD") tools 79 are all connected in tandem with the drillstring 20. Flex subs, for example, are used for integrating the MWD tools 79 into the drilling assembly 90. The MWD and other sensors in the drilling assembly 90 make various measurements including pressure, temperature, drilling parameter measurements, resistivity, acoustic, nuclear magnetic resonance, drilling direction, etc. while the borehole 26 is being drilled. The EM telemetry communication tool 100 obtains the signals from the downhole sensors and transmits such signals to the surface. One or more sensors 111 at the surface receive the EM signals and provide the received signals to a surface controller or control unit 40 for further processing according to programmed instructions associated with the controller 40.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
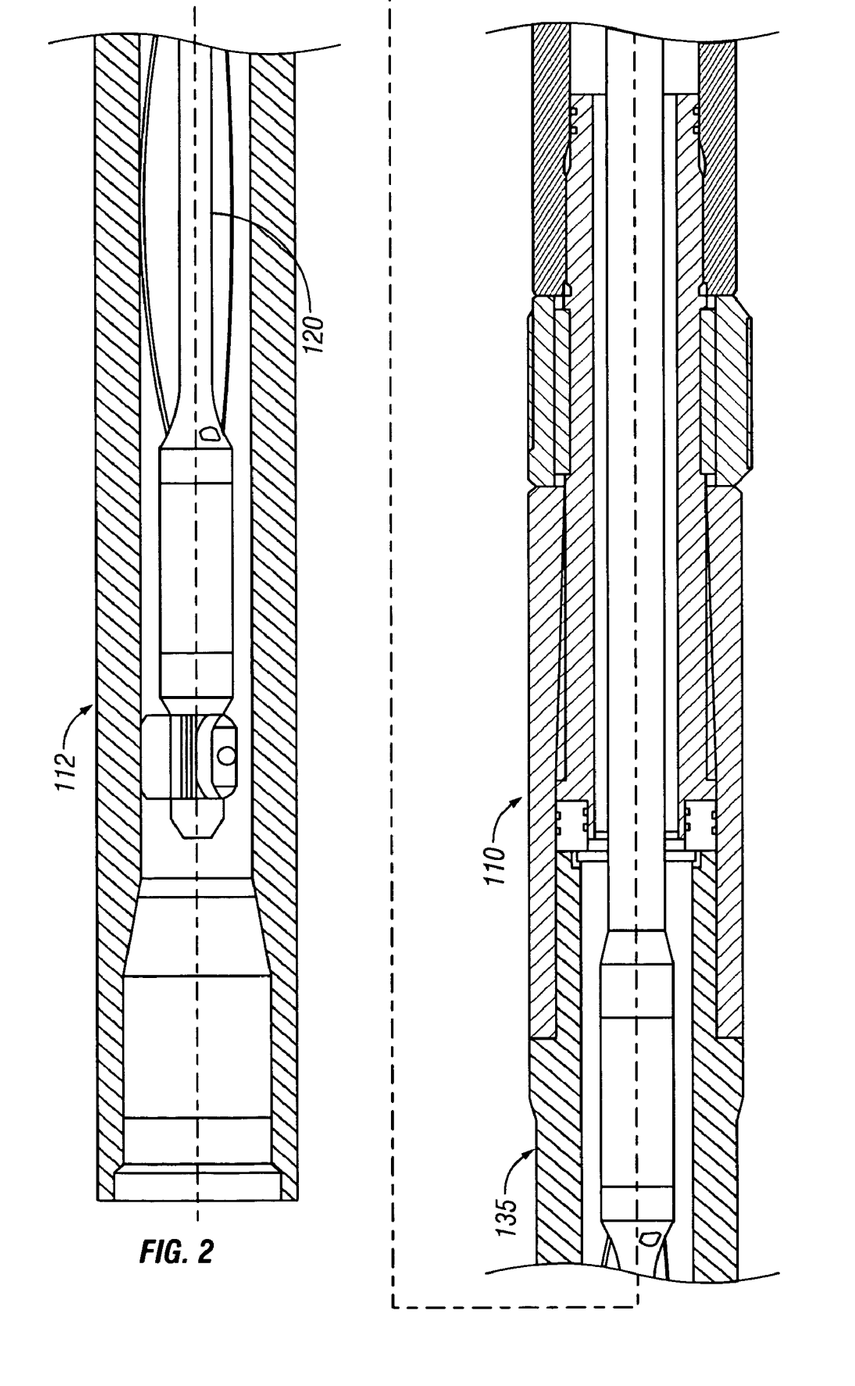
FIG. 2 shows a schematic illustration of an embodiment of the EM Telemetry tool according to one embodiment of the present invention coupled to an upper portion of a drilling assembly.

FIG. 2 shows a schematic diagram of a portion of the bottomhole assembly 90 that includes an EM telemetry tool or apparatus 100 according to one embodiment of the present invention. As noted earlier, the EM Telemetry tool 100 can be coupled to a drill pipe 22 at its upper end and the various sensors and drilling assemblies of the BHA 90 at its lower end. The EM telemetry tool or apparatus 100 includes an insulating connector or gap sub 110 that insulates the drill pipe 22 coupled to an upper metallic portion or section 112 of the BHA from a lower portion or section 114 of the BHA to form a dipole antenna for the EM telemetry tool 110. A suitable electrical contact or device 120 provides an electrical contact or electrode 116 for the upper section 112 and an electrical contact or electrode 122 for the lower section 114. The EM transmitter and associated electronics 126 may be housed in a transmitter section 124 below or downhole of the gap sub 110. The gap sub 110 is coupled to a drill collar 130 via a threaded connection 134 and to the drill pipe or another upper section member by a threaded connection 135. A connection 148 at the bottom of the tool may be utilized to connect it to other tools. The details of the various exemplary embodiments of the gap sub 110 are described below in reference to FIGS. 3-6.

A memory module or section 140 is suitably coupled to the transmitter section 124. The memory module 140 may be utilized to store the information from the downhole sensors and the data to be transmitted to the surface via the EM telemetry tool 100. The downhole sensors may include a directional sensor module 144 that provides information about the BHA direction in the wellbore, and a gamma ray module and any other module (generally denoted herein by numeral 146). Such modules are disposed or connected below the EM telemetry tool 100. A drilling motor or mud motor 55 along with formation evaluation sensors (not shown) are usually disposed between the drill bit 50 and the EM telemetry tool 100. In this manner data or signals from any downhole sensor or tool may be transmitted to the surface via the electromagnetic telemetry tool 110.

Figure 3:
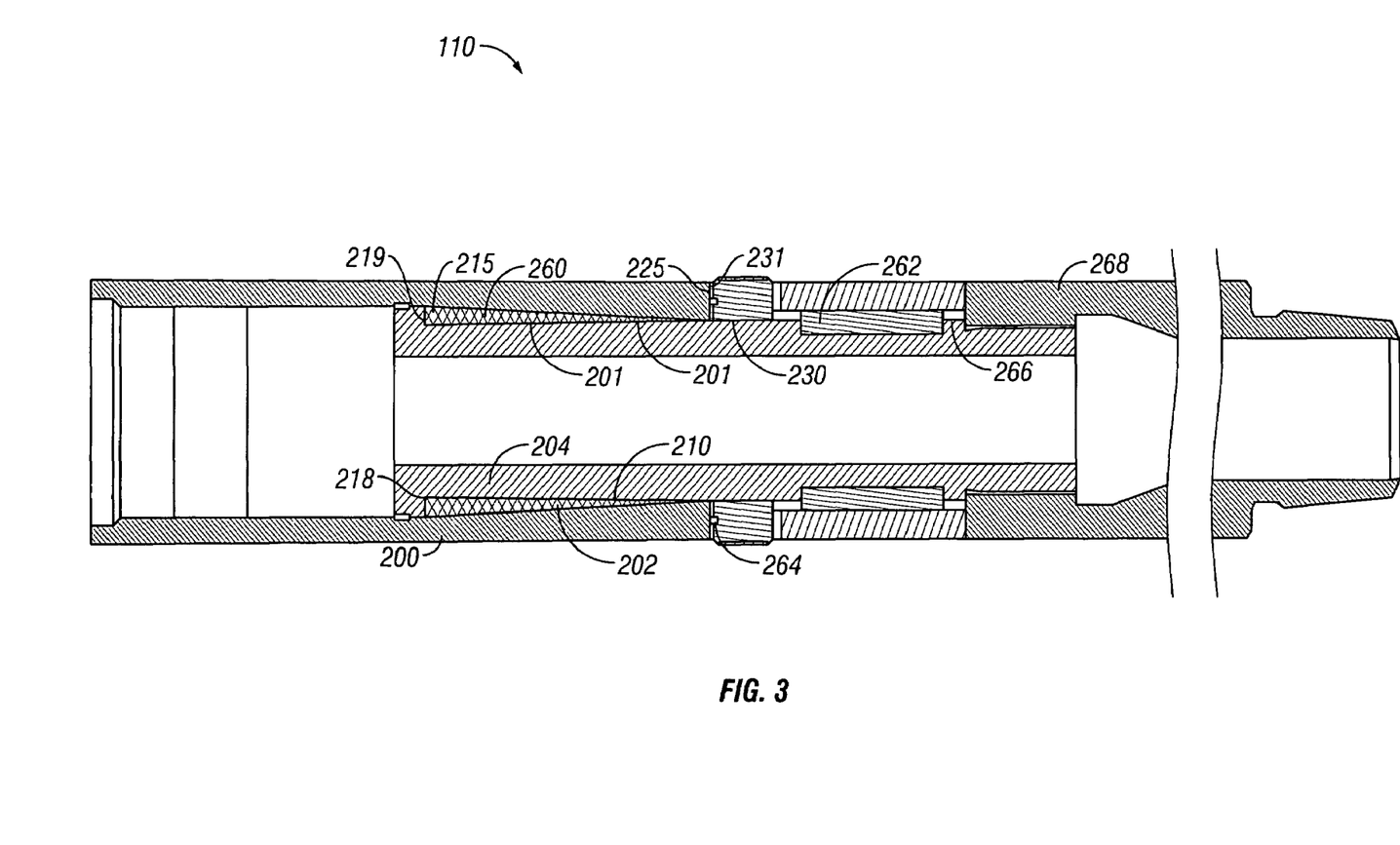
FIG. 3 shows a cross-section portion of an electrically insulating connector or a gap sub according to one embodiment of the present invention.

FIG. 3 shows a cross-section of an insulating connector or gap sub 110 according to one embodiment of the present invention. The insulating connector 110 includes a first or an outer female member 200 that has an internal longitudinal surface 202 that may be conical. The female member 200 is generally cylindrical in its outer dimensions. A second or male member 204 is disposed inside the female member 200. The male member 204 has a cylindrical longitudinal outer surface 206 that provides a longitudinal conical gap 210 between the female and the male members. The longitudinal conical gap 210 may extend substantially along the length of the conical inner surface 202 of the female member 200. A conical sleeve 215 (also referred to herein as the "clamping sleeve") is placed or disposed between the female member 200 and the male member 204. The sleeve 215 may extend along the substantial or entire length of the gap 210 and its dimensions may match or substantially match the dimensions of the gap 210. A shoulder 218 prevents or inhibits the axial or longitudinal movement of the sleeve 215 toward the uphole or the first axial direction and an end 201 of the female member 200 prevents the longitudinal movement of the sleeve 215 in the downhole or the second axial direction. A longitudinal shoulder member 230 clamped between a loading sub 134 (see FIG. 2) and the female member 200 prevents longitudinal movement of the female member toward the downhole direction.

The male member 204 is threadably connected to the loading sub 134 (see FIG. 2), which pulls the male member 204 in the axial direction relative to the female member 200. The centralizer 122 provides an electrical contact for the lower section 114. The member 230 may be a wear protection ring and a stabilizer. In one aspect, the outer longitudinal surface of the male member 204 is coated with the suitable insulating material 250 such as a ceramic material. The type and thickness of the insulating coating or layer is chosen so that it will withstand the downhole environmental and operating conditions. The inner edge 219 of the shoulder 218 also is coated or sprayed with the desired insulating material. The outer edge 225 of the female member 200 and/or the inner edge 231 of the wear protection ring 230 is also coated with the insulating material. Thus, any surface of the female member 200 that comes in contact with any surface of the male member 204 or the lower section 114 remains insulated from such surfaces, thereby providing an insulating gap between the lower and upper sections 114 and 112 respectively.

In the embodiment described in FIG. 3, the insulating coating, in one aspect, is not applied to either surface of the sleeve 215. As noted above, the insulating coating or layer is applied to the cylindrical surface 202 of the male member and the shoulder 219 of the male member. To assemble or make up the connection of the gap sub members, member 230 is clamped. One or more parallel keys 262 or other suitable coupling members are placed in recesses 266 in the male member 204. A loading member 264 is then slid over the parallel keys 262. The arrangement prevents the relative rotation of the loading member 264 relative to the male member 204, while allowing axial movement of the loading member. Then torque is applied between the loading member 262 and member 230. The loading thread between loading sub and male member 204 pulls the male member away from the female member. The clamping sleeve stops this movement and creates a press fit between members 200, 215 and 204. The sleeve 215 and the insulative coating 260 are stressed due to the contact pressure when the joint or connector is assembled, but there is relatively minimal or negligible movement (longitudinal or axial movement) between the coated surface 250 of the male member 204 and the sleeve 215. The shoulder contact at 219 between the male member 204 and the sleeve 215 prevents the axial or longitudinal displaced of the sleeve 215. A key 264 may be provided to inhibit rotational movement of the shoulder member 230.

This insulating coating and sleeve arrangement reduces the likelihood of shearing of the insulating coating 260 due to any rotational and axial movement of the male and/or female members during assembly of the gap sub. The sleeve 215 protects the insulating material from wear and damage, thereby reducing the chances of failure downhole and thus improving the reliability of the gap sub 110 and hence the telemetry tool 100.

Figure 4:
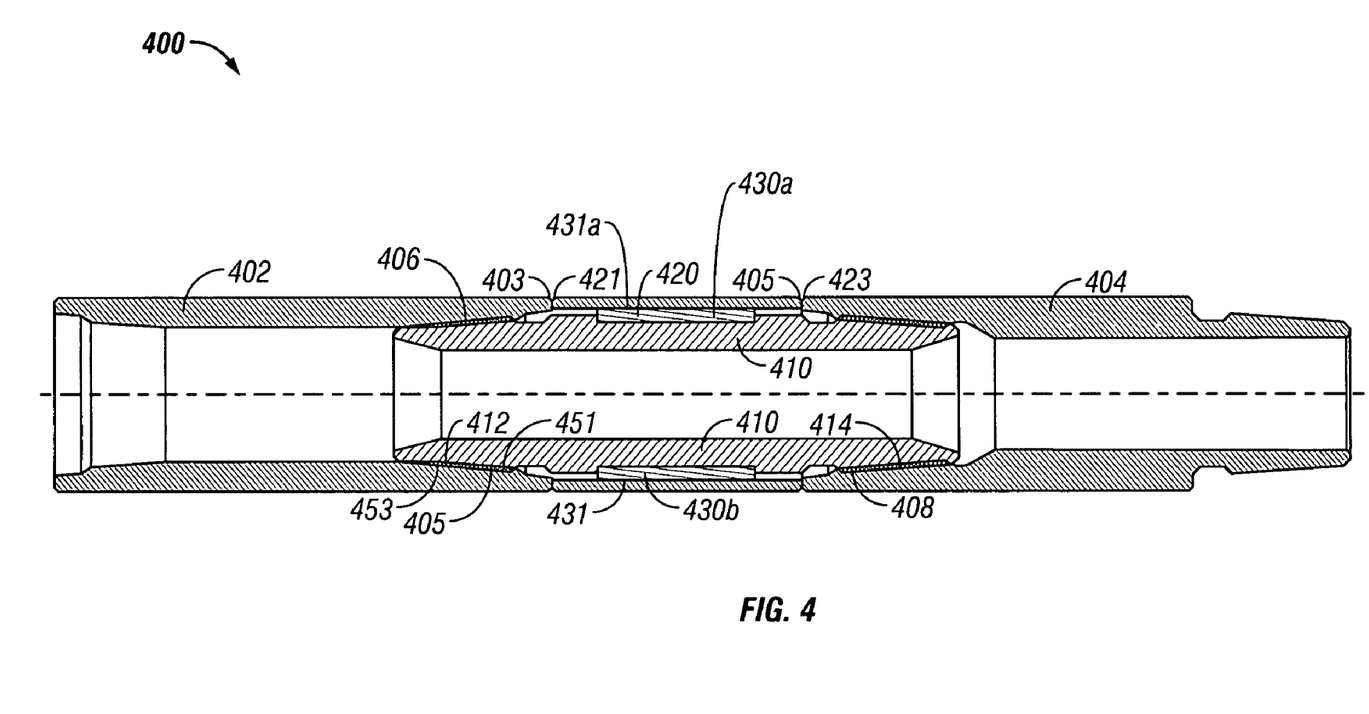
FIG. 4 shows a cross-section portion of an electrically insulating connector or a gap sub according to another embodiment of the present invention.

FIG. 4 shows another embodiment of an insulating connector or a gap sub 400 according to the present invention, which provides electrical isolation between an upper section or member 402 and a lower member 404. The upper and lower members also are referred to as upper and lower subs. The upper member 402 is generally a cylindrical threaded string connection member and includes an inner threaded section 406 at an end thereof. The lower member 404, similarly also may be a cylindrical threaded string connection member that includes an inner threaded section 408 at an upper end thereof. The upper and lower members 402 and 404 are coupled to each other via a double pin member or sub 410 that has an upper outer threaded end 412 that mates with the inner threaded section 406 of the upper member 402 and a lower threaded outer end 414 that mates with the inner threaded section 408.

The gap sub 400 further includes a loading sleeve 420 that surrounds the double pin member or sub 410. One or more parallel keys, such as keys 430a and 430b, may be placed or disposed in longitudinal recesses 431a and 431b between the double pin 410 and the loading sleeve 420 to prevent relative rotational motion between the double pin 410 and the loading sleeve 420. To provide insulation between the upper and lower members 402 and 404, certain areas of various members may be coated or sprayed with any suitable insulating material. In the exemplary embodiment of FIG. 4, the outer threaded connection area 412 and/or the inner threaded area 406 of the upper member 402 of the double pin 412 may be coated with insulating layers 451 and 453 respectively. The insulating coating 451 and 453 provide insulation through the double pin to prevent electrical connection between the lower and upper members 402 and 404. To prevent electrical connection between the upper and lower members 402 and 404 through the loading sleeve 420, one or both shoulders 421 and 423 of the loading sleeve maybe coated with a suitable insulating material. Alternatively or in addition to, shoulder member 403 of the upper member 402 and/or the shoulder member 405 of the lower member 404 may be provided with a suitable insulating material. Thus, in the exemplary embodiment of FIG. 4, the upper and lower sections 402 and 404 are electrically insulated due to the presence of insulation between the threaded sections 406 and 412, and insulation at the shoulder ends 403, 421, 405, and 423.

To assemble the device shown in FIG. 4, the double pin member 410 is mounted or threadably connected into the upper section 402. The connection at the threaded ends 406 and 412 is made up preferably without applying full torque such as by hand tightening. The parallel keys 430a and 430b are then mounted respectively into grooves 431a and 431b in the double pin 410. The loading sleeve 420 is then slid over the double pin 410. The parallel keys 430 and 430b prevent the relative rotation between the double pin 410 and the loading sleeve 420.

The assembly is completed by mounting the lower section 404, i.e., by threadably connecting the threaded section 408 over the threaded section 414 of the double key 410. In this manner, the threaded connection at 406, 412 and 408, 414 are loaded in one step: the loading sleeve 420 is held stationary, while the lower section 404 is rotated. Full torque is applied to the loading thread connection between 408 and 414. The electrically insulated thread connection at 406, 412 is loaded axially in this step without relative motion between the double pin 410 and the upper section 402 or between the loading sleeve 420 and the upper section 402. The coating in the insulated thread connections 406 and/or 412 and in the shoulders 403 and/or 423 is not stressed by shear forces resulting from the relative motion between the pin 410 and the lower section 404. The loading on the insulated parts or members is mainly compressional rather than due to shear stress. Such a loading is considered to be less likely to damage the insulating coating provided herein. This is due to the fact that these coatings have a much higher strength when loaded in compression than in shear direction.

Also, only the lower threaded connection 408 and 414 may be coated with an insulating material. In such cases, the threaded connection at 408 and 414 is made up by hand tightening, while the upper threaded connection 402 is tightened to apply axial or compressive force on the sleeve 420. The gap sub 400 then may be used, upside down, wherein the number 402 carries the pin 402 and member 404 carries the box 401 of the gap sub 400.

In the exemplary embodiment of FIG. 4, the loading sleeve 420 may be made of a single piece or may be separated into several sleeves. For example, one sleeve may take the make up torque and engage the parallel keys 420 and may not be coated with an insulating material. A second sleeve may be positioned uphole (i.e., toward the upper member 402) of the first sleeve and may be coated at its shoulders in the manner described above with respect to shoulder 421. In such an arrangement, no significant torque is transferred through the second sleeve. Alternatively, the second sleeve may also be separated into a stack of insulating bearing rings, which may provide redundancy of the insulation because a failure of insulation between some of these rings will not compromise the insulation properties of the gap sub 400. Such arrangements are shown and described below in reference to FIGS. 5 and 6.

Figure 5:
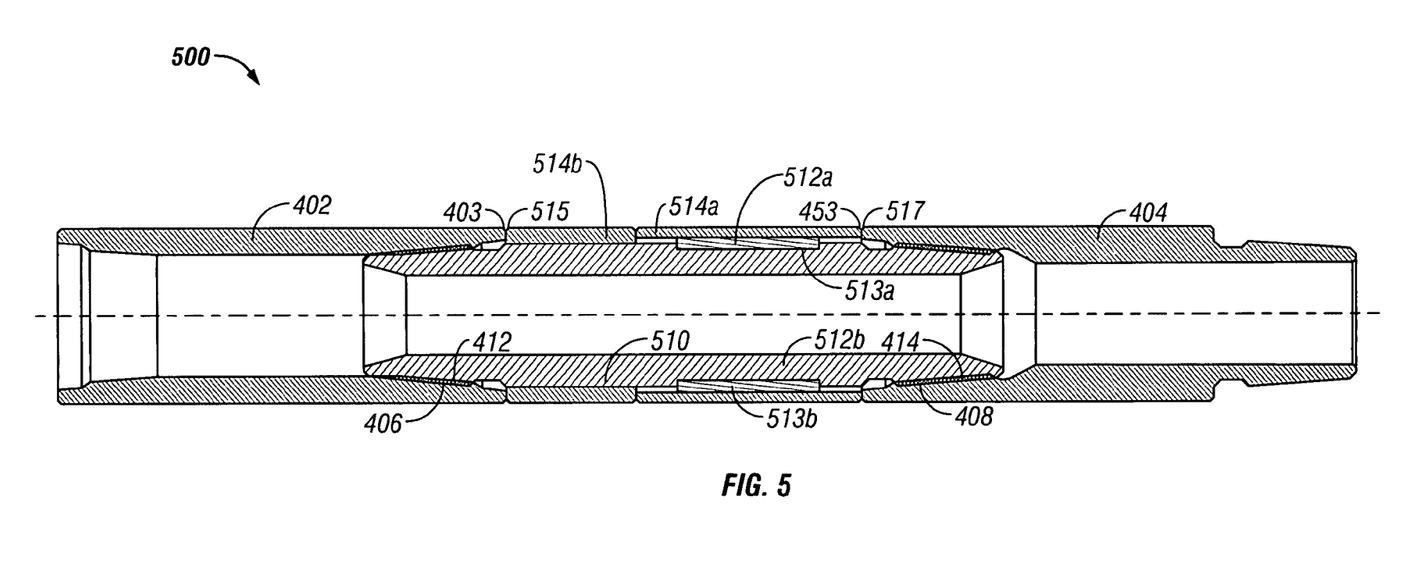
FIG. 5 shows a cross-section portion of an alternative embodiment of an insulating connector or gap sub according to the present invention.

FIG. 5 shows a cross-section of an alternative embodiment of a gap sub 500 according to the present invention. The elements in FIG. 5 that common with the elements of FIG. 4 are identified by the numerals of FIG. 4. In the gap sub embodiment of FIG. 5, the loading sleeve is shown to contain two separate sleeves 514a and 514b. The gap sub 500 is shown to include the double pin 510 that has the upper threaded section 412 mating with the threaded connection 406 of the upper member 402. The second sleeve 514b is positioned uphole of the first sleeve 514a. The lower edge 517 of the first sleeve 514a abuts against the upper edge 453 of the lower threaded connection 404. The upper edge 515 of the second sleeve 515b abuts against the edge 403 of the upper threaded connection 402. In this arrangement, the first sleeve 514a takes the makeup torque and engages the parallel keys 512. The sleeve 514a need not be coated with any insulating material. The second sleeve 514b that presses against the upper threaded connection 402 may be coated with an insulating material. The edge 403 and/or 515 may be coated to provide electrical insulation between the sleeve 514b and the upper threaded connection 402.

To assemble the gap sub 500, the upper end 412 of the double pin is threadably connected into the lower threaded section 406 of the upper threaded connection 402. The double pin 510 may be tightened manually (hand tightened), i.e., without applying full torque, as described above with respect to FIG. 4. The upper sleeve 514b is then placed over the double pin 510. The parallel keys 512a and 512b (which may be one or more) are placed in longitudinal slots 513a and 513b respectively. The first sleeve 514a is then mounted over the parallel keys 512a and 512b. The threaded portion 408 of the lower section 404, 412, and 418, 414 are then loaded in a single step by threadably connecting the pin 510 with the lower section 404. The coatings in the insulated connection 404, 412 and 403, 515 are stressed mainly due to compression, i.e., due to the loading of the lower sub 404. The insulated threads 402, 412 and shoulder 403, 515 are not stressed by shear forces resulting from the relative motion between the threads 406 and 412, and shoulders 403 and 515. As described above, the stress loading is less likely to damage the insulating coatings and the coating tends to retain much higher strength when loaded in compression rather that in shear direction.

Figure 6:
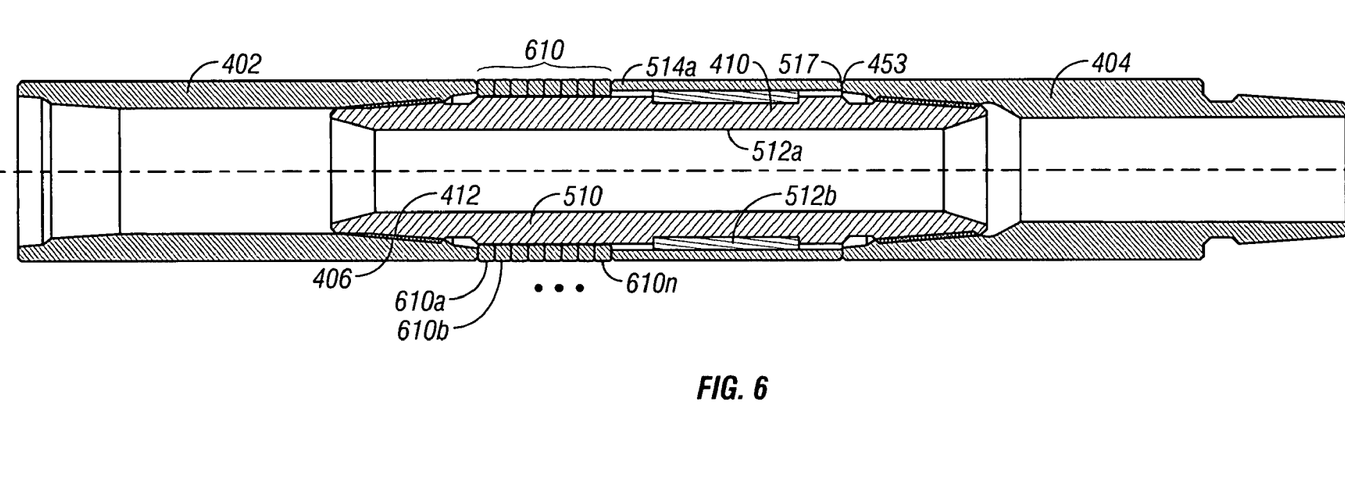
FIG. 6 shows a cross-section portion of yet another embodiment of an insulating connector or gap sub according to the present invention.

FIG. 6 shows yet another embodiment of the sleeve section of the gap sub 600. In the embodiment of the gap sub 600, the first sleeve 514 and the parallel keys 512a and 512b may be the same as shown and described with respect to FIG. 5. However, the second sleeve 514b is separated into a stack of insulating bearing rings 610a-610n (collectively designated by numeral 610). One or more of the rings may be coated with an insulating material to provide electrical insulation between the upper and lower subs 402 and 406. When multiple rings are coated, failure of insulation between some of these rings will not comprise the insulation properties of the gap sub 600. To assemble the gap sub 600, the stack of rings 600 are installed over the double pin 510 after the double pin 510 has been mated with the upper sub 402. After inserting the parallel keys 512a and 512b, the sleeve 514a is mounted around the keys. The lower sub 404 is then threadably connected to the double pin 510 as described above in reference to FIG. 4 and FIG. 5.

In any of the gap sub embodiments according to the present invention, the insulation coating material may be a ceramic material, such as alumina or titanium oxide and may be applied to the selected sections of the various members by any suitable means, including but not limited to applying the material under heat or by plasma are techniques. Alternatively, if certain members, such as the double pin 410 and loading sleeve 420 are made of titanium, then the coating material may be titanium oxide applied by a plasma-electrolytic process. Additionally, the insulating material may be any other suitable material, including but not limited to high strength polymers such sold under the trade name "PEEK." Also, the high strength polymers may be filled with ceramic particles in order to improve their ability to withstand compression forces during assembly and during use in the downhole environment.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An electromagnetic data transmission apparatus comprising:
   a transmitter configured to transmit electromagnetic signals;
   a connector configured to electrically isolate an upper metallic section of the apparatus from a lower metallic section of the apparatus to form a dipole antenna, the connector comprising:
      a first metallic member;
      a second metallic member placed in the first metallic member, wherein one of the metallic members includes a surface with an electrically insulating material thereon, the first and second metallic members being dimensioned to provide a longitudinal gap therebetween; and
      a sleeve member disposed in the longitudinal gap.

2. The apparatus of claim 1, wherein the longitudinal gap is conical.

3. The apparatus of claim 1, wherein the first metallic member has a conical inner surface and the second metallic member is a tubular member, thereby forming the longitudinal gap as a conical gap.

4. The apparatus of claim 3, wherein the second metallic member includes a shoulder that prevents axial movement of the sleeve member in at least one direction relative to the first metallic member.

5. The apparatus of claim 2 further comprising a loading member coupled to the second member that prevents rotational movement between the first metallic member and the second metallic member during assembly of the insulating connector.

6. The apparatus of claim 5 further comprising an insulating material between the loading member and the first metallic member.

7. The apparatus of claim 1, wherein the upper metallic section includes a drill pipe and the lower metallic section includes a bottomhole assembly that has a plurality of sensors for providing data for transmission to the surface.

8. The apparatus of claim 1 further comprising a first electrical contact for the upper metallic section and a second electrical contact for the lower metallic section to form the dipole antenna.

9. The apparatus of claim 1 further comprising an electrical circuit configured to control the electromagnetic signals transmitted by the transmitter.

10. An apparatus for providing an electrical insulating connection between metallic sections, comprising:
    a first member having an inner longitudinal conical surface;
    a second member placed in the first member, the first and second members having dimensions that provide a longitudinal gap therebetween, the first member further having an outer substantially uniform longitudinal surface, wherein one of the members includes a surface with an electrically insulating material thereon, and
    a sleeve disposed in the longitudinal gap to provide protection to the insulating material.

11. The apparatus of claim 10, wherein the longitudinal gap is conical in shape and the sleeve is dimensioned to substantially conform to the shape of the conical gap.

12. The apparatus of claim 10, wherein the second member includes a shoulder proximate to an end of the sleeve to inhibit axial movement of the sleeve.

13. The apparatus of claim 10, wherein the second member is coupled to a loading member that inhibits rotational movement of the second member relative to the first member during assembly.

14. The apparatus of claim 10, wherein the first member is adapted to be coupled to an upper metallic section and the second member is adapted to be coupled to a lower metallic section, the upper and lower metallic sections forming antennas of a dipole antenna.

15. The apparatus of claim 14, wherein the second member having a through passage.

16. An apparatus for use in a wellbore, comprising:
    a pin member connected at a first end to an upper section and at a second end to a lower section;
    a loading member associated with the pin member configured to come under compression when the upper and lower sections are connected to the pin member; and
    an electrically insulating material between one of the first end of the pin member and the upper section or the second end of the pin member and the lower section and between the loading member and the upper sections to electrically isolate the upper and lower sections from each other.

17. The apparatus of claim 16, further comprising a key member between the pin member and the loading member that inhibits rotational movement of the pin relative to the loading member.

18. The apparatus of claim 16, wherein the loading member further comprises a first sleeve member that engages a key member and a second sleeve member that provides insulation between the upper and lower sections.

19. The apparatus of claim 16, wherein the insulating materials is one of (i) alumina, (ii) titanium oxide, (iii) a polymer material; (iv) a polymer filled with ceramic particle; and (v) PEEK.

20. The apparatus of claim 16, further comprising an electromagnetic transmitter coupled to the upper and lower sections, wherein the upper and lower sections form antennas of a dipole antenna.

21. The apparatus of claim 16, wherein the loading member further comprises a sleeve member engaging a key member and a plurality of ring members that electrically isolate the upper and lower sections.

* * * * *